United States Patent Office 2,985,918
Patented May 30, 1961

2,985,918

METHOD FOR FORMING SHAPED LENGTHS OF TETRAFLUOROETHYLENE POLYMERS HAVING A CELLULAR STRUCTURE

Robert L. Moore and William J. Atwell, Lancaster, Pa., assignors to Raybestos-Manhattan, Inc., Manheim, Pa., a corporation of New Jersey No Drawing. Filed Jan. 20, 1959, Ser. No. 787,811

10 Claims. (Cl. 18—55)

This invention relates to a process for forming shaped lengths of tetrafluoroethylene polymers having a cellular structure, and to resin compositions particularly adapted for use therein. More particularly, the present invention relates to a process for producing continuous lengths of rod, tubing, tape and the like, having minute interconnecting pores substantially uniformly dispersed throughout, involving extrusion through a die, and to paste extrusion compositions for use in such process.

Articles having a cellular structure and formed from synthetic resins, such as thermoplastic resins, are well known. The cellular structure may generally be obtained by means of certain inorganic salts, such as ammonium carbonate, which decompose into gases at temperatures at which the resin is in a plastic state, by other highly soluble inorganic salts, such as sodium chloride, which may by leached from the resin product, or by means of foaming agents such as low boiling volatile liquid.

While frequently classified as a thermoplastic resin, tetrafluoroethylene polymers do not flow, as do conventional materials of this type, when heated to elevated temperatures. For example, polytetrafluoroethylene has a crystalline structure at normal temperatures, but when heated to above 620° F., changes to an amorphous gel which does not flow to any great extent, and only limited deformation can be achieved without fracturing the gel.

In order to form cellular products of tetrafluoroethylene polymers, there should be employed a cell-forming or sponging agent which volatilizes, preferably relatively slowly, at temperatures above the sintering temperature so that the polymer is in a gel state. If the sponging agent gasifies at temperatures substantially below the sinter temperature, as do the commonly employed inorganic sponging agents, cell formation is generally incomplete and non-uniform due to subsequent collapse during sintering of the voids. Because the polymer gel has little tendency to flow, the sponging agent should volatilize slowly at sintering temperatures if uniform pore formation, as regards size and distribution of pores is to be obtained, and rupture and distortion of the gel is to be prevented.

Attempts have been made to form cellular articles of tetrafluoroethylene polymers employing compression molding techniques. This procedure involves cold molding a mixture of a tetrafluoroethylene compression molding powder and a cell-forming or sponging agent, such as ammonium carbonate, and subsequent transfer of the molded article to an oven heated to a temperature above the sintering temperature of the polymer. This procedure has met with little success for reasons hereto given; however, even if it were entirely satisfactory for the preparation of cellular products of tetrafluoroethylene polymers of relatively small dimensions, the procedure would be entirely inapplicable to the manufacture of continuous lengths of rod, tape, or tubing due to practical limitations in the size of molds.

Substantial lengths of rod or tubing of tetrafluoroethylene polymer are generally made by extruding a paste composition comprising an intimate mixture of finely divided tetrafluoroethylene polymer and a volatile organic lubricant. Such a process is described in U.S. Patent No. 2,685,707. Considerable difficulties are encountered, however, when attempts have been made to adapt this extrusion process to the manufacture of rod, tubing, or the like, having a cellular structure, employing those materials, such as heat-decomposable inorganic salts, commonly used as cell-forming or sponging agents. As stated above, inorganic sponging agents, such as ammonium carbonate, decompose and volatilize rapidly at temperatures substantially below the sintering temperature of tetrafluoroethylene polymers. Although extrusion with the aforementioned composition comprising a mixture of polymer and lubricant can be effected without application of heat, during extrusion, temperatures substantially above the decomposition temperatures for such inorganic salts are commonly encountered. Thus, such sponging agents may gasify to a considerable extent during extrusion, which results in the production of an extrudate of non-uniform dimensions, and in the case of tubing, may even cause rupture of the tubing. Furthermore, such inorganic sponging agents, because of their relatively low decomposition temperature, may gasify during vaporization of volatile lubricant, which generally takes place at temperatures somewhat below sintering temperatures, and a substantial portion of any voids formed close up before the polymer is completely sintered.

A principal object of this invention is to provide shaped lengths of tetrafluoroethylene polymers having a cellular structure.

Another object of this invention is the provision of a process for producing continuous shaped lengths of tetrafluoroethylene polymers having minute interconnecting pores substantially uniformly dispersed throughout, involving extrusion through a die and sintering of the extrudate.

A further object of this invention is to provide a novel paste composition comprising a tetrafluoroethylene polymer particularly adapted to be extruded to form shaped lengths of the polymer having a cellular structure.

A still further object of this invention is the provision of a process involving extrusion through a die, and a novel paste composition for use therein, for producing continuous shaped lengths of tetrafluoroethylene polymers having minute interconnecting pores substantially uniformly dispersed throughout, which process overcomes the disadvantages of processes heretofore employed in obtaining cellular structures of tetrafluoroethylene polymers.

These and other objects of this invention will become more clearly apparent from a further consideration of this specification and claims.

The process according to this invention for forming shaped lengths of tetrafluoroethylene polymers having a cellular structure comprises extruding through a die a paste composition comprising finely divided tetrafluoroethylene polymer and finely divided methyl methacrylate polymer intimately admixed with a volatile organic lubricant, and thereafter heating the resultant shaped article above the sintering temperature of the tetrafluoroethylene polymer to sinter tetrafluoroethylene polymer and to decompose and volatilize the acrylic polymer to form minute interconnecting pores substantially uniformly dispersed throughout the article.

Preferably the composition which is extruded comprises from about 42 percent to about 55 percent, by weight, of tetrafluoroethylene polymer particles of colloidal size and from about 30 to about 40 per cent of methyl methacrylate polymer particles having a particle size of from about 100 to about 200 microns intimately admixed with a naphtha boiling in the range from about 195° and about 250° F. According to a preferred embodiment of the invention, the volatile inorganic lubricant is removed by volatilization before the tetrafluoroethylene polymer reaches the sintering temperature.

The cellular extrudate may be in the form of rods, tubes, films, tapes, sheets and the like, which articles find various uses. For example, tubing may be employed as packing for reciprocating valve stems, and rod may be used in valve seats. These are but a few of the varied uses for the cellular tetrafluoroethylene polymer products produced according to this invention.

This invention is predicated on the discovery that a composition comprising finely divided tetrafluoroethylene polymer and finely divided thermoplastic methyl methacrylate polymer intimately admixed with a volatile lubricant, such as a naphtha, to form a paste, may be extruded, if desired continuously, into useful articles such as sheets, rods, tubes, filaments, coatings, etc., and upon heating of the extruded articles to sintering temperatures, a cellular product is obtained by decomposition and volatilization of the acrylic polymer. The product thus produced may have minute interconnecting pores of relatively uniform size substantially uniformly dispersed throughout the product. There is no tendency on the part of the methyl methacrylate to decompose and volatilize during extrusion which results in the formation of pores which may subsequently collapse during sintering of the polymer, for the methyl methacrylate polymer decomposes and volatilizes at sintering temperatures for the tetrafluoroethylene polymer. Furthermore, this decomposition and volatilization of the acrylic resin takes place at a relatively slow rate. Thus, the tetrafluoroethylene polymer gel, which is extremely viscous, is neither ruptured nor distorted. Also, the methyl methacrylate polymer decomposes and volatilizes without leaving any carbonaceous residue which would interfere with desirable pore formation and undesirably discolor the extrudate. By reason of this invention the disadvantages of the prior methods involving the use of well known heat-decomposable sponging agents have been obviated.

The products produced according to this invention are spongy, and have a tough, leather-like appearance and may contain as high as 50 percent of minute interconnected pores or cells which are substantially uniform as regards size and distribution throughout the product.

Tetrafluoroethylene polymers which may be employed in the method and compositions of this invention comprise polytetrafluoroethylene (i.e. a tetrafluoroethylene homopolymer) and tetrafluoroethylene copolymers, as for example those comprising a polymerizable product of tetrafluoroethylene and another unsaturated organic compound, such as ethylene and chlorotrifluoroethylene, containing a terminal ethylenic double bond. The organic compound capable of being copolymerized with tetrafluoroethylene may be present in an amount up to 15 percent of the combined weight of tetrafluoroethylene and the said copolymerizable compound, provided the presence thereof does not destroy the essential character qualities of the resin. The term tetrafluoroethylene polymer used in this specification and claims covers polymers and copolymers of tetrafluoroethylene that possess a high degree of polymerization and a sintering temperature above about 580° F., above which sintering temperatures such polymers form an extremely viscous gel, rather than actually melt to a liquid.

The tetrafluoroethylene polymer may comprise from about 28 to about 76 percent, by weight, of the paste composition comprising said polymer, methyl methacrylate polymer and a volatile organic lubricant. Preferably the paste extrusion composition comprises from about 42 to about 55 percent, by weight, of tetrafluoroethylene polymer.

The particle size of the tetrafluoroethylene polymer is preferably colloidal, for example has an average particle size within the range from about 0.5 to 5 microns. Methods for preparing tetrafluoroethylene polymers of colloidal particle size are not the subject of this invention, are well known, and for example are described in U.S. Patent No. 2,685,707.

The sponging or cell-forming agent employed in the method and compositions of this invention comprises a thermoplastic methyl methacrylate polymer which decomposes, probably into the monomer, and volatilizes at a temperature within that range of temperatures generally employed in sintering of tetrafluoroethylene polymers, namely from about 670° to about 750° F. Methyl methacrylate polymers which are particularly suitable for this purpose are those having a molecular weight within the range of from about 150,000 to 300,000. In order to obtain pores of substantially uniform size the methyl methacrylate polymer, in finely divided form, preferably has a particle size range does not vary to any great extent. The particle size of the methyl methacrylate polymer may be from about 50 to 300 microns, and preferably is in the range between about 100 and 200 microns. When methyl methacrylate polymer having the particle size stated above is employed in the method and compositions of this invention, the cells formed by decomposition and volatilization of this polymer are minute, and are substantially uniformly dispersed throughout the product.

The methyl methacrylate polymer may comprise from about 10 to about 50 percent, and preferably comprises from about 30 to about 40 percent, by weight, of the paste extrusion composition. If the amount of methyl methacrylate sponging agent is substantially less than 10 percent the resulting product will be only slightly porous. On the other hand, no advantage is to be gained by using an amount of methyl methacrylate sponging agent substantially in excess of 50 percent, for the void content is not significantly increased over the void content obtainable by the presence of acrylic sponging agent in the proportions recited above.

A particular advantage of employing methyl methacrylate polymer as a sponging agent is that it decomposes into a gas which is volatilized from the tetrafluoroethylene polymer at polymer sintering temperatures without charring of the tetrafluoroethylene polymer or leaving any organic residue which would interfere with pore formation and discolor the product. This property of methyl methacrylate resins is particularly surprising in view of the organic nature thereof, and the fact that other organic thermoplastic polymers do not produce similar results. For example, when polyethylene is employed as a sponging agent, it is incompletely decomposed during sintering temperatures so that cell formation is very poor and the product contains a substantial proportion of carbonaceous residue of the polyethylene.

The composition which is employed in the method of this invention is in the nature of a dry (i.e., non-aqueous) pressure-coalescing lubricated polymer mixture. The lubricant may comprise any volatile organic lubricant which is liquid under extrusion conditions and has a viscosity at 25° C. of at least 0.45 centipoise, and preferably 0.45–1000 centipoises. Preferred lubricants are essentially saturated aliphatic and cycloaliphatic hydrocarbons boiling in the range between about 150° and 550° F. at atmospheric pressure. Examples of these materials are paraffin oils, mineral oils such as white oil, and commercial mixtures of hydrocarbons, e.g. a naphtha, boiling in the range stated above. A preferred volatile lubricant comprises a naphtha boiling in the range between about 195° and 250° F.

The proportion of lubricant in the polymer mixture should provide the extrusion composition with a paste-like consistency which provides for smooth extrusions. Generally the volatile organic lubricant may comprise from about 14 to about 22 percent, by weight, and preferably from about 15 to about 18 percent, of the paste extrusion composition.

The paste extrusion compositions of this invention comprising tetrafluoroethylene polymer, methyl methacrylate polymer, and a volatile organic lubricant may be prepared by various methods. For example, commercially available tetrafluoroethylene polymer of colloidal particle size, such as E.I. du Pont de Nemours & Co. "Teflon 6" extrusion powder, and commercially available finely divided methyl methacrylate polymer such as Rohm & Haas Company, Inc. "Y–100," which powder passes 50 percent through a 100 mesh screen, 100 percent through an 18 mesh screen may be placed in a container and the required amount of lubricant, such as the naphtha, may be added to the mixture of polymers. Preferably the polymer powders are blended together in a grinding apparatus in an inert atmosphere, such as an atmosphere of liquid nitrogen. If desired a surface active agent, such as a fatty alcohol amine sulfate, may be added to the powder blend in order to assist in wetting of the polymer particles by the volatile organic lubricant.

Other materials may be incorporated in the paste extrusion composition of this invention provided they do not adversely effect the cell-forming properties of the methyl methacrylate polymer. For example, finely divided solid fillers, pigments, dies, stabilizers, and plasticizers may be added to the composition in varying amounts. Examples of suitable fillers and pigments which may be employed include carbon black, graphite, mica, talc, silica, and titanium dioxide. All of these fillers or pigments should be in finely divided form and preferably should approximate the particle size of the tetrafluoroethylene polymer in the mixture. The fillers and pigments serve either to color or to extend and reinforce the polymer, resulting in mixtures having increased flexibility in some cases and in mixtures having lower cost where a cheap filler is selected.

The paste extrusion compositions described above may be formed under pressure into a cylindrical billet or preform, and the preform may then be placed in a ram-type extruder from which the composition is forced through a forming die by the ram. Thereafter the volatile lubricant may be volatilized and the extrudate, substantially free of lubricant, may be heated to sintering temperatures in order to sinter the tetrafluoroethylene polymer and decompose and volatilize the methyl methacrylate polymer to provide the desired cellular product. As stated previously, the extrudate may be in the form of a tube, rod, tape or the like.

In preparing the preform or billet of the paste extrusion composition, the composition may be compacted in a preform cylinder which may be provided with a centrally disposed core rod if a tubular product is desired. After inserting a closure plug in the preform cylinder, pressure of from about 100 to about 300 p.s.i. may be applied for a period of several minutes to compact the preform. The resulting preform is a dense, clay-like product.

The basic equipment used for extrustion of the composition consists of a ram, a cylinder, and a die, on a suitable supporting frame. Preferably, a hydraulic piston is employed to drive the ram. In the case of extruding a tube, the extrusion equipment should be provided with a centrally disposed mandrel over which the ram travels.

Extrusion is generally carried out batch-wise, the apparatus being stopped after each preform has been extruded, and the ram retracted to insert a new preform in the extrusion cylinder. The pressure required for extrusion will vary, depending to a large degree on the ratio of the cross-section of the preform to that of the extrudate. If this ratio is, for example 250:1, a pressure of the order of 5000 p.s.i. at the ram face is generally required.

The extrusion equipment may be operated when disposed in either a horizontal or vertical direction. A horizontal extrusion may be employed in conjunction with subsequent batch-wise vaporizing and sintering, and vertical extrusion may be employed in conjunction with subsequent continuous vertical vaporizing and sintering.

In either method, the extrudate is first heated to a temperature sufficient to volatilize the volatile organic lubricant. This temperature is generally from about 150° F. to 575° F., according to volatility of the lubricant and cross section of the extrudate.

When volatilization of lubricant is complete, the temperature is increased above about 580° F., to effect sintering of the tubing and cell formation by decomposition and vaporization of the methyl methacrylate polymer. Preferably the temperature of the extrudate should reach 700–750° F. for good sintering and good cell formation. The extrudate should be maintained at a sintering temperature for a sufficient amount of time to insure complete volatilization of the methyl methacrylate and good sintering of the tetrafluoroethylene polymer.

The following is a specific example of the process and composition of this invention.

60 g. of colloidal sized particles of polytetrafluoroethylene (E. I. du Pont de Nemours & Co., Teflon T-6 Paste Extrusion Powder) and 40 g. of methyl methacrylate polymer having a particle size such that all particles pass through a 200 mesh screen (Rohm & Haas Co., Inc., Y–100) are placed in a grinding mill and ground and blended together under an atmosphere of liquid nitrogen. 18 g. of a white oil having an A.P.I. gravity of 49/51, a Saybolt viscosity at 100° F. of 30/35, an initial boiling point of 370/400° F. and an end distillation point of 480/510° F. (L. Sonneborn Sons, Inc., Deo-Base white oil) and 0.54 g. of a fatty alcohol amine sulfate (E. I. du Pont de Nemours & Co., Dupanol OS) are thoroughly mixed together, and then blended with the powder mixture. The resulting paste composition is molded into an annular preform and extruded in tubular form from a laboratory extruder comprising a cylinder, a mandrel and a ram which travels over the mandrel.

The extrudate coming from the tubular extruder has an I.D. of .250″ and an O.D. of .500″. The tubular extrudate is heated to a temperature of about 550° F. for a period of one hour in order to volatilize the lubricant. Thereafter, the extrudate is heated to a temperature of about 700° F. for a period of about 60 minutes in order to sinter the extrudate and decompose and volatilize the methyl methacrylate polymer. The resulting product has a tough, leather-like appearance and contains about 50 percent voids in the form of minute interconnected pores substantially uniformly dispersed throughout the tubular product.

It is understood that many details of the foregoing description are for the purpose of illustration and are subject to variation. The invention, therefore, is not to be limited to such details but is to be construed in accordance with the spirit and scope of the claims.

What is claimed is:

1. A process for forming shaped lengths of tetrafluoroethylene polymers having a cellular structure which comprises extruding through a die a paste composition which comprises an intimate mixture of from about 28 to about 76% by weight, of unsintered, finely divided tetrafluoroethylene polymer, from about 10 to about 50% of finely divided methyl methacrylate polymer having a particle size of from about 50 to about 300 microns, and from about 14 to about 22% of a volatile organic lubricant, and thereafter heating the resultant shaped article to a temperature above the sintering temperature of the tetrafluoroethylene polymer to sinter the tetrafluoroethylene polymer and to decompose and volatilize said acrylic polymer to form minute interconnecting pores substantially uniformly dispsersed throughout said article.

2. The process according to claim 1 in which said composition comprises from about 42 to about 55 percent, by weight of tetrafluoroethylene polymer, from about 30 to about 40 percent of methyl methacrylate polymer, and from about 15 to about 18 percent of volatile organic lubricant.

3. The process according to claim 1 in which substantially all of the volatile organic lubricant is removed by volatilization before the tetrafluoroethylene polymer reaches the sintering temperature.

4. A process for forming shaped lengths of tetrafluoroethylene polymers having a cellular structure which comprises extruding through a die a paste composition which comprises an intimate mixture of from about 28 to about 76 percent, by weight, of unsintered tetrafluoroethylene polymer particles of a colloidal size, from about 10 to about 50 percent of methyl methacrylate polymer particles having a particle size of from about 50 to about 300 microns and from about 14 to about 22 percent of a volatile organic lubricant which is essentially a hydrocarbon lubricant from the group consisting of saturated aliphatic and cycloaliphatic hydrocarbons having a viscosity of at least 0.45 centipoise at 25° C. and boiling in the range between about 150° and about 550° F., and thereafter heating the resultant shaped article to a temperature above the sintering temperature of the tetrafluoroethylene polymer to volatilize said lubricant and to sinter the tetrafluoroethylene polymer and to decompose and volatilize said acrylic polymer to form minute interconnecting pores substantially uniformly dispersed throughout said article.

5. The process according to claim 4 in which said composition comprises from about 42 to about 55 percent, by weight, of tetrafluoroethylene polymer, from about 30 to about 40 percent of methyl methacrylate polymer, and from about 15 to about 18 percent of hydrocarbon lubricant.

6. The process according to claim 5 in which said particles of methyl methacrylate polymer have a particle size of from about 100 to about 200 microns.

7. The process according to claim 6 in which said hydrocarbon lubricant comprises a naphtha boiling in the range between about 195° and about 250° F.

8. The process according to claim 4 in which substantially all of said hydrocarbon lubricant is removed by volatilization before the tetrafluoroethylene polymer reaches the sintering temperature.

9. The process according to claim 4 in which said composition is extruded in the form of a continuous film, tape, sheet, or the like.

10. The process according to claim 4 in which said composition is extruded in the form of a tube or rod.

References Cited in the file of this patent

UNITED STATES PATENTS

| | | |
|---|---|---|
| 2,400,091 | Alfthan | May 14, 1946 |
| 2,685,707 | Llewellyn et al. | Aug. 10, 1954 |
| 2,689,380 | Tait | Sept. 21, 1954 |
| 2,718,452 | Loutz | Sept. 20, 1955 |
| 2,752,321 | Heller | June 6, 1956 |
| 2,752,637 | Walker et al. | July 3, 1956 |
| 2,856,377 | Fuchs et al. | Oct. 14, 1958 |